Patented June 14, 1938

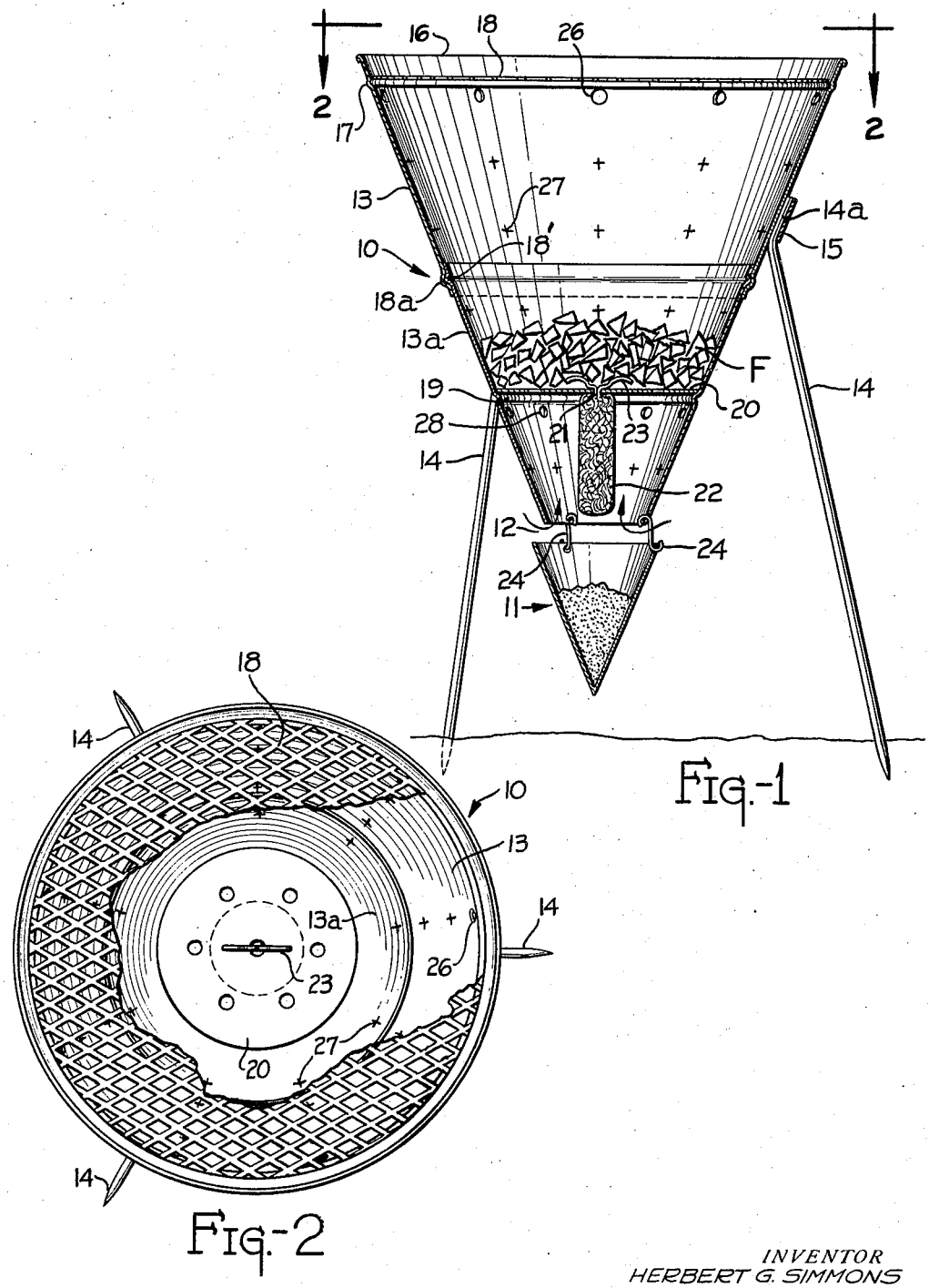

2,120,683

UNITED STATES PATENT OFFICE 2,120,683

BARBECUE GRILL

Herbert G. Simmons, Indianapolis, Ind., assignor to Prest-O-Lite Battery Company, Inc., Indianapolis, Ind., a corporation of New York Application July 30, 1936, Serial No. 93,321

1 Claim. (Cl. 126—29)

This invention relates to grills, more particularly to grills burning charcoal or the like, suitable for outdoor use.

A grill of the type disclosed is very convenient for use on picnics or any outdoor gathering where food or the like is to be subjected to heat as by broiling or barbecuing. This is especially true if the grill is collapsible and may be conveniently carried in an automobile for outings. For further convenience on occasions of this kind, a simple and effective igniter means is provided to make it easy to start a fire in the grill, a means which is safe in operation and will be useful for the life of the grill.

It is, therefore, a principal object of this invention to provide a grill that is adapted for outdoor use, which has an ash catcher and a simple igniter means to start a fire.

It is a further object of this invention to provide a grill that is adapted for outdoor use which is collapsible and may be conveniently carried on outings.

Other objects and advantages of this invention relating to the arrangement, operation and function of the related elements of the structure, to various details of construction, to combinations of parts and to economies of manufacture, will be apparent to those skilled in the art upon consideration of the following description and appended claim, reference being had to the accompanying drawing forming a part of this specification wherein like reference characters designate corresponding parts in the several views.

Figure 1 is a sectional elevation of the grill.

Figure 2 is a plan view looking along line 2—2 of Figure 1.

Referring to the drawing, there is disclosed a grill which is in the nature of an inverted cone, having a truncated portion 10 to form a frusto-conical section and an apex portion 11 with a gap 12 therebetween for draft. The truncated portion having the frusto-conical section is preferably divided at an intermediate position so that the parts of the cone may be separated and nested together into a smaller space for convenience in transportation.

The parts of the inverted cone are preferably made from sheet material such as iron or the like, formed into circular contour and held together by means of a simple lapped joint. Any convenient way of forming the sections will be used such as by welding, riveting or the like.

The upper frustum 13 of the truncated portion is provided with legs 14 to support it in a definite relation with respect to a supporting datum. The legs 14 are attached to the upper frustum by channel-shaped members 15 which have laterally extending lugs which may be conveniently attached to the side of the grill by welding, riveting or the like. The upper end of the legs 14 are provided with squared shanks 14a which fit in slidable relation with the channels 15 so as to hold the frustum 13 firmly in horizontal position.

The upper exposed edge of the frustum 13 is rolled back to form a bead 16. At an intermediate position, preferably adjacent the bead 16, an outwardly rolled bead 17 is formed in the frustum 13, into which is seated the perforated plate or grill 18, which is of such diameter that the peripheral edge engages the bead. Extraneous material, such as food, is positioned on the grill 18 during the broiling operation. The position of the grill 18 is governed by the distance which the food or other material is to be placed with reference to a fire built on the interior of the truncated portion as will be described hereinafter.

A second frustum 13a is provided to nest on the inside of the upper frustum 13 and depends therefrom through cooperating outwardly-rolled beads 18' and 18a, formed on the upper frustum and the depending frustum respectively. The cooperating beads 18' and 18a are preferably positioned as near as possible to the upper and lower edges of the two cooperating parts forming the frusto-conical section to form a seat to hold the depending frustum in position with reference to the upper frustum. At an intermediate position in the depending frustum 13a there is provided an inwardly rolled bead 19 which provides a seat for a perforated grate plate 20 of such diameter that the periphery thereof contacts the bead 19. The grate plate provides a supporting means for a fire F in the frusto-conical section, which may be made of charcoal or the like as is clearly shown in Figure 1.

At a central position on the grate plate 20, a wire clip 21 is provided, which has a depending portion 22 encased with absorbent non-inflammable material such as asbestos or the like, and laterally bent portions 23 on the upper end of the depending portion 22, which engage the upper side of the grate plate 20 through a central perforation and tie the clip and the plate together. The depending portion 22 is made of any convenient length, preferably of such length as not to extend below the truncated portion of the cone.

Below the truncated portion of the cone, the ash catcher 11 is positioned which is in the nature of a cone-shaped appendage to form an apex section as described above. The ash catcher 11 is held in spaced relation with the bottom of the truncated cone portion to form the gap 12 by means of clips 24 which thread in apertures formed in both portions. The clips hold the ash catcher in concentric alignment with the frusto-conical section so as to catch all ash particles falling from the grate plate 20.

Both frustums 13 and 13a of the truncated cone are perforated at advantageous positions to assist the proper combustion of the fuel above the grate plate 20 and may be in the nature of apertures 26 and 28 positioned immediately below the grill 17 and the grate plate 20, respectively, and star perforations 27 at various positions within the cone. The principal air inlet for combustion is the gap 12 formed between the truncated cone portion and the ash catcher.

During use, the device is assembled substantially as shown in Figure 1. The grill 18 is then removed from the bead 17 and the grate plate 20 is removed by lifting it from its seat upon the bead 19, the clip 21 being removed at the same time. The non-inflammable absorbent material embracing the clip 21 is then saturated with some inflammable fluid, such as gasoline, kerosene or the like, and the grate plate is then returned to its seat upon the bead 19. The charcoal or other inflammable material, of which the fire is to be formed, is then placed above the grate plate 20 as shown. The inflammable fluid is then ignited, by means of a match or the like, through the gap 12 which causes the fuel positioned above the grate plate 20 to be heated to the combustion point and form the fire. As the fuel is consumed, the ashes will drop through the perforations in the grate plate 20 and will be caught in the ash catcher 11, so that the ashes will not be scattered upon the supporting plane.

In this manner, the grill may be used upon lawns etc. without injuring them by hot ashes contacting the grass. With the grill 18 in its initial position, the fire is allowed to burn until a bed of red coal is obtained above the grate plate 20, at which time meats and other foods may be placed upon the grill for broiling. After use, the grill is conveniently disassembled and packed into a small space for easy transportation.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed is:

In a device of the class described, a frusto-conical supporting member, detachable supporting legs cooperating with the supporting member to hold the member in inverted position, a frusto-conical depending member of substantially equal depth cooperating with the supporting member, outwardly projecting bead means on both members adapted to cooperate and hold the members in locked position, grill means cooperating with the supporting member, and grate means cooperating with the depending member.

HERBERT G. SIMMONS.